(12) United States Patent
Armstrong

(10) Patent No.: US 8,120,540 B1
(45) Date of Patent: Feb. 21, 2012

(54) RF ANTENNA SYSTEM HAVING LOW-POWER REQUIREMENTS FOR RFID TAG COMMUNICATION

(75) Inventor: Lincoln Armstrong, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 839 days.

(21) Appl. No.: 12/214,301

(22) Filed: Jun. 6, 2008

(51) Int. Cl.
  *H01Q 1/12* (2006.01)
  *H01Q 21/00* (2006.01)
  *G06K 19/077* (2006.01)
(52) U.S. Cl. .......................... 343/718; 343/893; 235/492
(58) Field of Classification Search .................. None
  See application file for complete search history.

(56) References Cited

U.S. PATENT DOCUMENTS

| | | | |
|---|---|---|---|
| 3,299,424 A * | 1/1967 | Vinding | 340/10.3 |
| 4,135,184 A | 1/1979 | Pruzick | |
| 4,769,656 A * | 9/1988 | Dickey | 343/718 |
| 5,221,831 A | 6/1993 | Geiszler | |
| 5,682,143 A * | 10/1997 | Brady et al. | 340/572.7 |
| 6,094,173 A | 7/2000 | Nylander | |
| 6,271,756 B1 | 8/2001 | Daies, Jr. et al. | |
| 6,335,686 B1 | 1/2002 | Goff et al. | |
| 6,438,407 B1 * | 8/2002 | Ousdigian et al. | 600/510 |
| 6,600,420 B2 | 7/2003 | Goff et al. | |
| 6,647,286 B1 * | 11/2003 | Kato et al. | 600/509 |
| 6,696,954 B2 | 2/2004 | Chung | |
| 7,961,097 B2 * | 6/2011 | Porte et al. | 340/572.1 |
| 2002/0109643 A1 * | 8/2002 | Buckles | 343/893 |
| 2009/0151828 A1 * | 6/2009 | Zhao et al. | 152/152.1 |
| 2011/0032174 A1 * | 2/2011 | Sinnett et al. | 343/885 |

\* cited by examiner

*Primary Examiner* — Trinh Dinh

(74) *Attorney, Agent, or Firm* — Fredric J. Zimmerman

(57) ABSTRACT

An RF antenna system for RFID tag communication includes a terminal and wire antennas extending therefrom. Each wire antenna has a first end electrically coupled to the terminal and a second end that is unencumbered. At least a portion of each wire antenna to include the second end thereof is flexible in at least one direction so that an RFID tag of an RFID-tagged object contacts at least one of the wire antennas.

28 Claims, 2 Drawing Sheets

RF ANTENNA SYSTEM HAVING LOW-POWER REQUIREMENTS FOR RFID TAG COMMUNICATION

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to "radio frequency identification" (RFID) tag communication, and more particularly to an RF antenna system that does not need much power to communicate with RFID tags.

BACKGROUND OF THE INVENTION

Radio frequency identification (RFID) "tags" are used in a variety of commercial and government applications to provide the means to securely identify an object to which a tag is affixed. Briefly and as is known in the art, RFID tags are powerless passive devices that are "activated" in the presence of a radio frequency (RF) electromagnetic wave. An activated RFID tag resonates to thereby produce a unique wireless signal that can be read/decoded. In general, an RFID tag "reader" includes the means to transmit RF energy for activation of a RFID tag, and the means to receive RF energy produced by the RFID tag. Thus, related-art RFID readers typically employ one or more RF antennas to perform the transmission and reception functions.

In many warehouse-type environments, RFID-tagged items are carried by hand, moved about using a cart or hand truck, or moved about using conveyers, elevators, or other mechanized handling systems. RFID readers for these types of environments will incorporate a reader's antenna(s) along a travel route in order to monitor movement and/or location of RFID-tagged items. Currently, these antennas are either attached or embedded in rigid panels positioned adjacent the mechanized handling systems, or are attached or embedded in flexible panels positioned in the path of items of moving along the mechanized handling system. In either case, the antennas rarely or never come very close to the passing RFID tag. Accordingly, to assure system robustness, the antennas must generate an RF transmission with enough power to assure that the transmission reaches the RFID tag. Unfortunately, if the RFID-tagged item is sensitive to electromagnetic radiation (EM), the item could be adversely affected by the RFID reader. In terms of EM sensitive ordnance or chemicals, this situation could result in a catastrophe.

SUMMARY OF THE INVENTION

Accordingly, it is an object of the present invention to provide an RF antenna system suitable for use in RFID tag communication.

Another object of the present invention is to provide an RF antenna system that will contact or very nearly contact an RFID tag on an object that passes by the RF antennas system.

Still another object of the present invention is to provide an RF antenna system that has reduced power requirements for use in RFID communication.

Other objects and advantages of the present invention will become more obvious hereinafter in the specification and drawings.

In accordance with the present invention, an RF antenna system for RFID tag communication includes a terminal and a plurality of wire antennas. The terminal, is adapted to be coupled to a source of RF energy. Each wire antenna has a first end and a second end with the first end thereof being electrically coupled to the terminal and each second end thereof being unencumbered. At least a portion of each wire antenna to include the second ends thereof is flexible in at least one direction.

BRIEF DESCRIPTION OF THE DRAWINGS

Other objects, features and advantages of the present invention will become apparent upon reference to the following description of the exemplary embodiments and to the drawings, wherein corresponding reference characters indicate corresponding parts throughout the several views of the drawings and wherein:

FIG. 2C is a view from beneath the RF antenna system taken along line 2-2 in. FIG. 1 in order to illustrate yet another embodiment of the arrangement of wire antennas;

DETAILED DESCRIPTION OF EXEMPLARY EMBODIMENTS OF THE INVENTION

Figure 1:
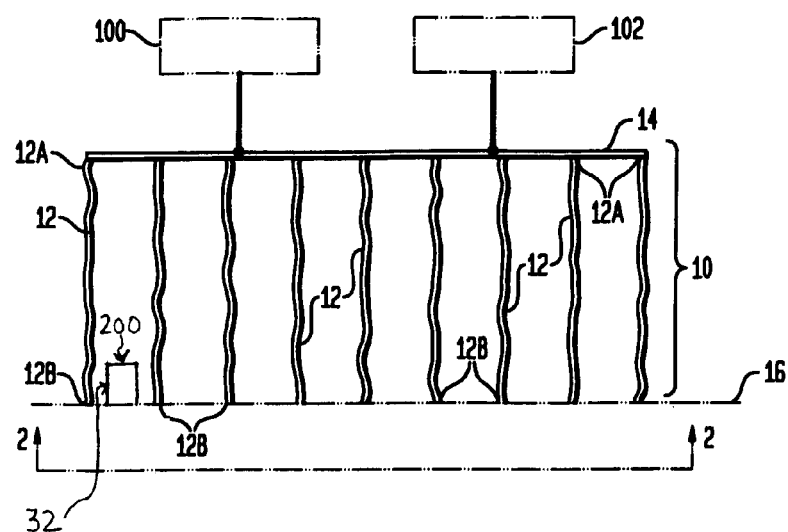
FIG. 1 is a schematic view of an RF antenna system for use in RFID tag communication in accordance with an exemplary embodiment of the present invention in which the RF antennas extend vertically.

Referring now to the drawings and more particularly to FIG. 1, an RF antenna system in accordance with the present invention is shown and is referenced generally by numeral 10. As will be explained further below, RF antenna system 10 is specifically designed for use in the field of RFID tag communication to include the activation or excitation of an RFID tag 32 (not shown in detail) and/or the detection or reading of RF signals produced by an activated RFID tag. Accordingly, RF antenna system 10 will have one or both of an RF source 100 and RFID reader 102 coupled thereto as would be understood in the art. RF source 100 and RFID reader 102 could be separate components or could be incorporated into a single device. Thus, the particular configurations of RF source 100 and/or RFID reader 102 are not limitations of the present invention.

In general, RF antenna system 10 includes a plurality of flexible wire antennas 12 and a common terminal 14. More specifically, each of wire antennas 12 has a first end 12A that is electrically (and usually mechanically) coupled to terminal 14 so that the wire antennas 12 extend from the common terminal 14 as the wire antennas 12 may be attached to the common terminal 14. A second or outboard end 12B of each wire antenna 12 is free to move in accordance with a mechanical force applied thereto. Electrically speaking, each outboard end 12B defines an open- circuit termination so that each wire antenna 12 is essentially similar to a monopole whip antenna. In the illustrated exemplary embodiment, wire antennas 12 extend downward in a substantially vertical direction from terminal 14 so that the wire antennas 12 are substantially perpendicular to the common terminal 14. The lengths of wire antennas 12 can be such that outboard ends 12B thereof all terminate at approximately the same height or level as indicated by dashed line 16. However, it is to be understood that the finish height or level of outboard ends 12B can be varied without departing from the scope of the present invention.

Before describing some exemplary embodiments of the present invention, the guiding principles on which the embodiments are based will first be explained. As described above, related-art RFID activation or reading is predicated on the wireless transmission of signals to/from an RFID tag over some stand-off distance. Indeed, one of the great advantages of RFID tag systems is the ability to identify, remotely, an object that incorporates an RFID tag as the RFID-tagged object passes in the general vicinity of an RFID reader. However, the electromagnetic (EM) power of the RF signals must be sufficient to transit the stand-off distance. Unfortunately, the required power can cause catastrophic results if the RFID-tagged object includes EM- sensitive chemicals, munitions, or weapons.

The present invention is designed to, in an exemplary embodiment, eliminate or, in another exemplary embodiment, almost eliminate the stand-off distance between an RFID tag 32 and the RF antenna used to activate and/or read the RFID tag. To do this, wire antennas 12 are designed to be flexible enough to conform to a passing RFID-tagged object 200 such that one or more of RF antennas 12, in an exemplary embodiment, substantially contact, that is, very nearly contact, or in another exemplary embodiment, contact the RFID-tagged object 200 or the RFID-tag 32 thereby creating, in an exemplary embodiment, a substantially zero stand-off distance, or in another exemplary embodiment, a zero stand-off distance between the RF antenna system 10 and the RFID tag 32. In particular, in an exemplary embodiment, the wire antennas 12 act as essentially pole antennas that receive best when the wire antenna 12 is oriented substantially parallel to a plane of a flat RFID tag 32, generally used, as most RFID tags use some type of pole or panel antenna, which broadcasts out along a normal vector (tangentially) from the plane of the RFID tag 32. Based on this general configuration, in an exemplary embodiment, the wire antennas 12 are no more than about 12 inches from the RFID-tagged object 200 in order to provide benefits over the conventional technology. Accordingly, the EM power needed to activate and/or read the RFID tag 32 can be reduced to levels that are less than prescribed sensitivity levels of a particular object that just passes near the RF antenna system 10 without substantially contacting the wire antennas 12.

Wire antennas 12 can be configured in a variety of ways to provide the amount of flexibility for the antennas and/or to control the direction of flexibility of the antennas. All of wire antennas can be configured in the same way, or the configuration of each wire antenna 12 (or several ones thereof) can be different depending on the location/position thereof in RF antenna system 10. Further, each wire antenna 12 can be the same or different along the length thereof without departing from the scope of the present invention.

Each wire antenna 12 can be a single strand of a wire conductor or multiple strands (e.g., twisted together) of wire conductors. The gauge of the wire conductor(s) can be the same or different along the length of wire antennas 12 without departing from the scope of the present invention. The gauge will be selected to provide the desired amount of wire antenna flexibility. For example, a heavier gauge might be used closer to attached ends 12A with the wire conductor(s) tapering to a lighter gauge closer to outboard ends 12B in order to improve antenna flexibility.

Each of wire antennas 12 could remain as bare wire conductors if RF antenna system 10 was only to be used as a means to activate an RFID tag. However, if RF antenna system 10 had some of wire antennas 12 configured for transmission and some configured for reception, it may be necessary to provide electrical insulation about the wire conductors as would be well understood in the art.

Figure 2A:
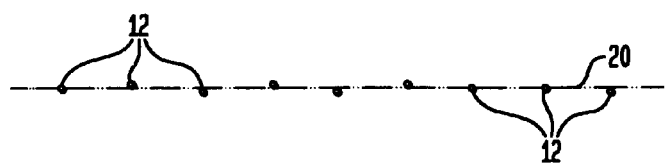
FIG. 2A is a view from beneath the RF antenna system taken along line 2-2 in FIG. 1 in order to illustrate an exemplary embodiment of the arrangement of wire antennas.
Figure 2B:
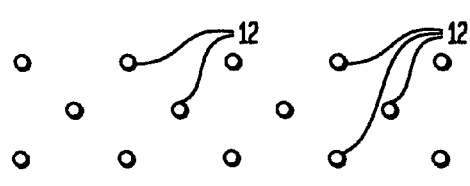
FIG. 2B is a view from beneath the RF antenna system taken along line 2-2 in FIG. 1 in order to illustrate another embodiment of the arrangement of wire antennas.
Figure 2C:
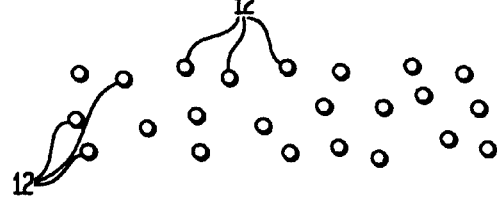

In general, wire. antennas 12 are arranged to define a "curtain" that an RFID-tagged item 200 must pass through. The curtain can be two-dimensional (i.e., substantially planar) or three-dimensional in nature without departing from the scope of the present invention. By way of exemplary embodiments, three possible "curtain" arrangements are illustrated in FIGS. 2A-2C that represent three possible views of RF antenna system 10 of the arrangement of wire antennas 12 as presented by outboard ends 12B. FIG. 2A illustrates this view for a substantially two-dimensional curtain such that wire antennas 12 are substantially arranged in a spaced-apart fashion along a line defined by dashed line 20. Note that while wire antennas 12 will extend downward in a substantially straight-line fashion from terminal 14 as the wire antennas 12 are attached to the terminal 14, the flexible nature of wire antennas 12 may cause them to be slightly displaced from straight line 20. FIG. 2B illustrates the view of outboard ends 12B for a three-dimensional curtain where outboard ends 12B are arrayed two-dimensionally in an ordered or patterned fashion. FIG. 2C illustrates the view of outboard ends 12B for another three-dimensional curtain in which outboard ends 12B are again arrayed two-dimensionally but in a random fashion. The exemplary embodiments shown in FIGS. 2B and 2C increase the robustness of RF antenna system 10 in terms of assuring contact with an RFID tag that must pass through the "curtain" arrangement of wire antennas.

Figure 3A:
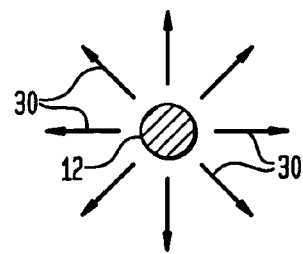
FIG. 3A is a cross-sectional view of a wire antenna that is circular in cross-section.
Figure 3B:
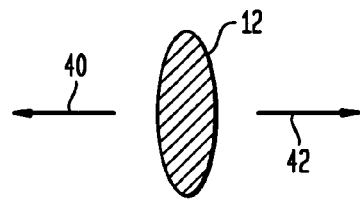
FIG. 3B is a cross-sectional view of a wire antenna that is oblong in cross-section.

As mentioned above, each of wire antennas 12 can be configured to provide flexibility in a similar or varied fashion along the lengths thereof. In addition, each of wire antennas 12 may be configured such that the direction of flexibility is controlled. For example, FIG. 3A illustrates a cross-sectional view of a wire antenna 12 that is circular in its cross-section. This shape will provide the same flexibility in all radial directions as indicated by arrows 30. However, the cross- sectional shape of a wire antenna can also dictate a preferred direction of flexibility. For example, the oblong cross-sectional shape of a wire antenna 12 illustrated in FIG. 3B will, in an exemplary embodiment, flex in the two opposite directions indicated by arrows 40 and 42. Other cross-sectional shapes could also be utilized without departing from the scope of the present invention.

Figure 4:
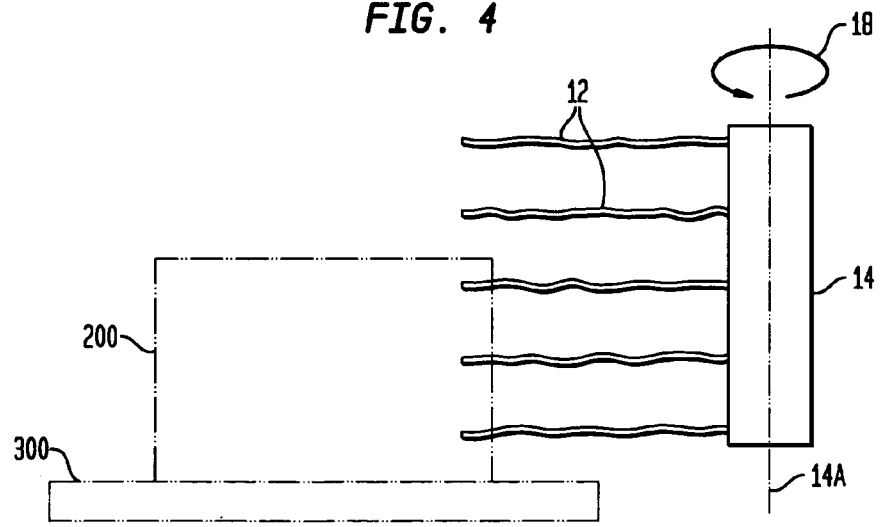
FIG. 4 is a schematic view of an RF antenna system for RFID tag communication in accordance with another embodiment of the present invention in which the RF antennas extend horizontally.

Although the description of the present invention has focused thus far on a vertically-disposed set of wire antennas, the present invention is not so limited. For example, in another exemplary embodiment as illustrated in FIG. 4, wire antennas 12 extend horizontally from terminal 14 as terminal 14 is rotated about into axis 14A. Such rotation is indicated by rotational arrow 18. This type of RF antenna system could be used when an RFID-tagged item 200 is to be placed on a stationary platform 300 in front of rotating wire antennas 12, or if RFID-tagged item 200 was moving vertically up or down (on platform 300) past rotating wire antennas 12. In this configuration, wire antennas 12 could also be distributed all around terminal 14 such that the arrangement of wire antennas resembled the bristles of a round brush as terminal 14 rotated about axis 14A.

The advantages of the present invention are numerous. The RF antenna system virtually guarantees, in an exemplary embodiment, a substantially zero stand-off distance, or in another exemplary embodiment, a zero stand-off distance to, in an exemplary embodiment, the RFID-tagged object 200, or, in another exemplary embodiment, the RFID tag 32, so that RFID interrogation can be carried out at low power levels. This invention will allow RFID tag communication to be used safely with EM sensitive items.

Although the invention has been described relative to a specific exemplary embodiments thereof, there are numerous variations and modifications that will be readily apparent to those skilled in the art in light of the above teachings. It is therefore to be understood that, within the scope of the appended claims, the invention may be practiced other than as specifically described.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed as new and desired to be secured by Letters Patent of the United States is:

1. An RF antenna system for communication with an RFID tag, comprising:
    a terminal electrically coupled to an RF source and an RFID reader, said source electromagnetic excitation energy to the RFID tag, said reader able to receive an excitation signal from the RFID tag; and
    a plurality of wire antennas extending from said terminal, each of said plurality of wire antennas having a first end and a second end with said first end electrically coupled to said terminal and each said second end is unencumbered,
    wherein at least a portion of said plurality of wire antennas include said second ends thereof is flexible in at least one direction.

2. The RF antenna system as in claim 1, wherein said portion of each of said plurality of wire antennas is circular in cross-section.

3. The RF antenna system as in claim 1, wherein said portion of each of said plurality of wire antennas is non-circular in cross-section.

4. The RF antenna system as in claim 1, where said portion of each, of said plurality of wire antennas is oblong in cross-section.

5. The RF antenna system as in claim 1, wherein said plurality of wire antennas are arranged vertically with said second ends thereof are disposed below said first ends thereof.

6. The RF antenna system as in claim 1,, wherein said plurality of wire antennas are arranged horizontally.

7. The RF antenna system as in claim 1, further comprising electrical insulation being disposed about each of said plurality of wire antennas.

8. The RF antenna system as in claim 1, wherein each of said plurality of wire antennas comprises a single strand of wire conductor.

9. The RF antenna system as in claim 1, wherein each of said plurality of wire antennas comprises multiple strands of wire conductors.

10. The RF antenna system as in claim 1, wherein said second ends of said plurality of wire antennas are arrayed substantially along a line.

11. The RF antenna system as in claim 1, wherein said second ends of said plurality of wire antennas are arrayed in a two-dimensional arrangement.

12. The RF antenna system as in claim 11, wherein said two-dimensional arrangement is random.

13. The RF antenna system as in claim 11, wherein said two-dimensional arrangement is ordered.

14. The RF antenna system as in claim 1, wherein said cross-section is oblong.

15. An RF antenna system for communication with an RFID tag, comprising:
    a terminal electrically coupled to an RF source and an RFID reader, said source emitting electromagnetic excitation energy to the RFID tag, said reader able to receive an excitation signal from the RFID tag; and
    a plurality of wire antennas, each of said plurality of wire antennas are electrically and mechanically coupled on just one end thereof to said terminal and extends away therefrom in a substantially straight-line fashion to an open-circuit termination that is mechanically free,
    wherein said plurality of wire antennas define a curtained arrangement, and
    wherein at least a portion of each of said plurality of wire antennas includes a cross-section that defines flexibility in at least one preferred direction.

16. The RF antenna system as in claim 15, wherein said cross-section defines flexibility in opposing directions.

17. The RF antenna system as in claim 15, wherein said cross-section is non-circular.

18. The RF antenna system as in claim 15, wherein said plurality of wire antennas extend vertically downward from said terminal.

19. The RF antenna system as in claim 15, wherein said plurality of wire antennas extend horizontally from said terminal.

20. The RF antenna system as in claim 15, further comprising electrical insulation disposed about each of said plurality of wire antennas.

21. The RF antenna system as in claim 15, wherein each of said plurality of wire antennas comprises a single strand of wire conductor.

22. The RF antenna system as in claim 15, wherein each of said plurality of wire antennas comprises multiple strands of wire conductors.

23. The RF antenna system as in claim 15, wherein said curtained arrangement of said plurality of wire antennas lie substantially in a plane.

24. The RF antenna system as in claim 15, wherein said curtained arrangement of said plurality of wire antennas comprises a random three-dimensional arrangement of said plurality of wire antennas.

25. The RF antenna system as in claim 15, wherein said curtained arrangement of said plurality of wire antennas comprises an ordered three-dimensional arrangement of said wire antennas.

26. The RF antenna system as in claim 15, wherein an object carrying the RFID tag substantially contacts at least one of said plurality of wire antennas.

27. An RFID interrogation system for communication with an RFID tag, comprising:
- an RF source emitting electromagnetic excitation energy to the RFID tag;
- an RFID reader able to receive an excitation signal from the RFID tag;
- a terminal electrically coupled to said RF source and said RFID reader; and
- a plurality of wire antennas extending from said terminal, each of said plurality of wire antennas having a first end and a second end with said first end electrically coupled to said terminal, and each said second end being unencumbered,
- wherein at least a portion of said plurality of wire antennas include said second ends thereof is flexible in at least one direction.

28. The RFID interrogation system as in claim 27, wherein said second ends of said plurality of wire antennas arc arrayed in a two-dimensional arrangement.

* * * * *